US012612016B2

(12) United States Patent
Ying et al.

(10) Patent No.: US 12,612,016 B2
(45) Date of Patent: Apr. 28, 2026

(54) ELECTRIC VEHICLE CHARGING PLANNING METHOD AND DEVICE

(71) Applicant: PATEO CONNECT+ Technology (Shanghai) Corporation, Shanghai (CN)

(72) Inventors: Zhenkai Ying, Shanghai (CN); Chuxiong Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 97 days.

(21) Appl. No.: 18/584,689

(22) Filed: Feb. 22, 2024

(65) Prior Publication Data

US 2024/0190282 A1 Jun. 13, 2024

Related U.S. Application Data

(63) Continuation of application No. PCT/CN2021/131871, filed on Nov. 19, 2021.

(30) Foreign Application Priority Data

Aug. 26, 2021 (CN) ........................ 202110992881.X

(51) Int. Cl.
*B60S 5/06* (2019.01)
*B60L 53/53* (2019.01)
(Continued)

(52) U.S. Cl.
CPC ................. *B60S 5/06* (2013.01); *B60L 53/53* (2019.02); *B60L 53/57* (2019.02); *B60L 53/66* (2019.02)

(58) Field of Classification Search
CPC .. B60S 5/06; B60L 53/53; B60L 53/57; B60L 53/67
See application file for complete search history.

(56) References Cited

U.S. PATENT DOCUMENTS

| | | | |
|---|---|---|---|
| 2019/0351783 A1 | 11/2019 | Goei | |
| 2019/0377349 A1 | 12/2019 | Van Der Merwe et al. | |
| 2020/0031239 A1 | 1/2020 | Chae et al. | |

FOREIGN PATENT DOCUMENTS

| | | |
|---|---|---|
| CN | 104175898 A | 12/2014 |
| CN | 105730271 A | 7/2016 |

(Continued)

OTHER PUBLICATIONS

The World Intellectual Property Organization (WIPO) International Search Report for PCT/CN2021/131871 May 11, 2022 6 Pages (including translation).

*Primary Examiner* — Donald J Wallace
*Assistant Examiner* — Alex B Griffin
(74) *Attorney, Agent, or Firm* — Anova Law Group, PLLC

(57) ABSTRACT

A vehicle charging planning method includes obtaining charging requests from a plurality of target vehicles, obtaining at least two apparatus transporters with fully charged mobile charging apparatuses, in response to a number of the target vehicles being greater than a number of fully charged mobile charging apparatuses in each apparatus transporter, determining whether driving paths of the at least two apparatus transporters to positions of the target vehicles have an overlapping position, in response to the driving paths having the overlapping position, exchanging the mobile charging apparatuses of the at least two apparatus transporters at the overlapping position and determining a target apparatus transporter, and instructing the target transporter to travel to positions of the target vehicles and providing charging services to the target vehicles using the mobile charging apparatuses on the target apparatus transporter.

19 Claims, 3 Drawing Sheets

(51) Int. Cl.
   B60L 53/57          (2019.01)
   B60L 53/66          (2019.01)

(56)              References Cited

FOREIGN PATENT DOCUMENTS

| CN | 106549433 | A  | 3/2017  |
| CN | 110034596 | A  | 7/2019  |
| CN | 110909952 | A  | 3/2020  |
| CN | 111882096 | A  | 11/2020 |
| KR | 101858734 | B1 | 5/2018  |

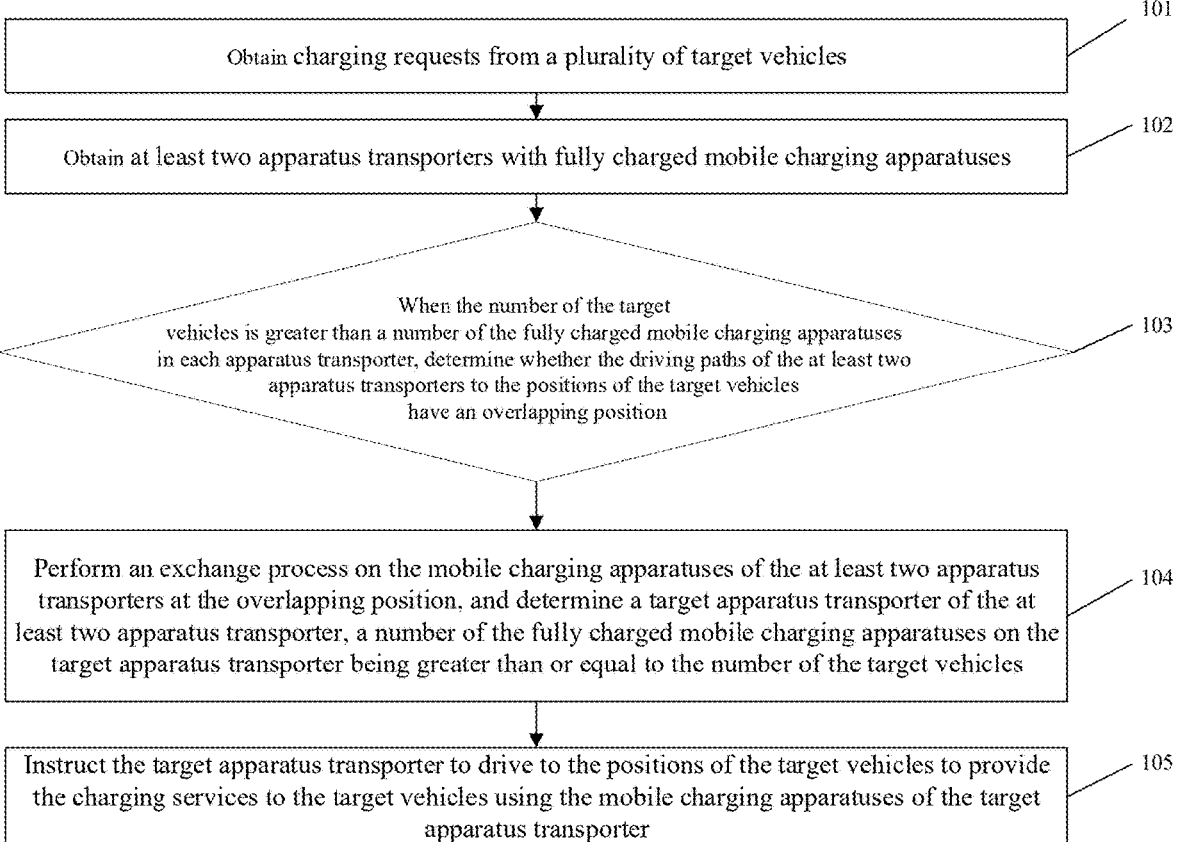

101

Obtain charging requests from a plurality of target vehicles

102

Obtain at least two apparatus transporters with fully charged mobile charging apparatuses

103

When the number of the target vehicles is greater than a number of the fully charged mobile charging apparatuses in each apparatus transporter, determine whether the driving paths of the at least two apparatus transporters to the positions of the target vehicles have an overlapping position

104

Perform an exchange process on the mobile charging apparatuses of the at least two apparatus transporters at the overlapping position, and determine a target apparatus transporter of the at least two apparatus transporter, a number of the fully charged mobile charging apparatuses on the target apparatus transporter being greater than or equal to the number of the target vehicles

105

Instruct the target apparatus transporter to drive to the positions of the target vehicles to provide the charging services to the target vehicles using the mobile charging apparatuses of the target apparatus transporter

FIG. 1

ELECTRIC VEHICLE CHARGING PLANNING METHOD AND DEVICE

CROSS-REFERENCE TO RELATED APPLICATION

The present disclosure is a continuation of International Application No. PCT/CN2021/131871, filed Nov. 19, 2021, which claims priority to Chinese Patent Application No. 202110992881.X, filed on Aug. 26, 2021, the entire contents of both of which are incorporated herein by reference.

TECHNICAL FIELD

The present disclosure relates to the vehicle charging technology field and, more particularly, to an electric vehicle charging planning method and an electric vehicle charging planning device.

BACKGROUND

An electric vehicle refers to a vehicle powered by a battery of the vehicle and driven by a motor to move wheels. Since the electric vehicle has a smaller impact on the environment compared to a conventional vehicle, the electric vehicle has bright prospects.

With an increasing number of users driving electric vehicles, a mobile charging apparatus (e.g., a charging flatbed truck) can be used to facilitate the charging of the electric vehicles.

When the mobile charging apparatus is used to provide a charging service for a vehicle, if a plurality of vehicles within a certain geographic area (e.g., a 300-meter geographic area) need to be charged, a charging service platform will dispatch a charging apparatus transporting vehicle for each vehicle of the plurality of vehicles. The charging apparatus transporting vehicle is driven to the location of each vehicle of the plurality of vehicles to provide charging service. Each charging apparatus transporting vehicle carries a plurality of mobile charging apparatuses. Thus, if three electric vehicles need to be charged in the geographic area, and one charging apparatus transporting vehicle carries three mobile charging apparatuses, the charging apparatus transporting vehicle can satisfy the charging requirements of the three electric vehicles of the geographic area. By dispatching three apparatus transportation vehicles, the charging cost is increased, and distribution resources are wasted.

SUMMARY

Embodiments of the present disclosure provide a vehicle charging planning method. The method includes obtaining charging requests from a plurality of target vehicles, obtaining at least two apparatus transporters with fully charged mobile charging apparatuses, in response to a number of the target vehicles being greater than a number of fully charged mobile charging apparatuses in each apparatus transporter, determining whether driving paths of the at least two apparatus transporters to positions of the target vehicles have an overlapping position, in response to the driving paths having the overlapping position, exchanging the mobile charging apparatuses of the at least two apparatus transporters at the overlapping position and determining a target apparatus transporter, and instructing the target transporter to travel to positions of the target vehicles and providing charging services to the target vehicles using the mobile charging apparatuses of the target apparatus transporter. A number of fully charged mobile charging apparatuses on the target apparatus transporter is greater than or equal to the number of the target vehicles.

Embodiments of the present disclosure provide a vehicle charging planning device including a charging request acquisition module, an apparatus transporter acquisition module, an overlapping position, a target apparatus transporter determination module, and a charging service module. The charging request acquisition module is configured to obtain charging requests from a plurality of target vehicles. The apparatus transporter acquisition module is configured to obtain at least two apparatus transporters with fully charged mobile charging apparatuses. The overlapping position determination module is configured to determine, in response to a number of the target vehicles being greater than a number of fully charged mobile charging apparatuses in each apparatus transporter, whether driving paths of the at least two apparatus transporters to positions of the target vehicles have an overlapping position. The target apparatus transporter determination module is configured to determine the target apparatus transporter of the at least two apparatus transporters by exchanging the mobile charging apparatuses of the at least two apparatus transporters at the overlapping position in response to the driving paths of the at least two apparatus transporters to the positions of the target vehicles having the overlapping position. A number of fully charged mobile charging apparatuses on the target apparatus transporter is greater than or equal to the number of the target vehicles. The charging service module is configured to instruct the target apparatus transporter to drive to the positions of the target vehicles to provide charging services to the target vehicles using the mobile charging apparatuses of the target apparatus transporter.

Embodiments of the present disclosure provide an electronic apparatus, including one or more processors and one or more memories. The one or more memories store computer-readable codes that, when executed by the one or more processors, cause the one or more processors to obtain charging requests from a plurality of target vehicles, obtain at least two apparatus transporters with fully charged mobile charging apparatuses, in response to a number of the target vehicles being greater than a number of fully charged mobile charging apparatuses in each apparatus transporter, determine whether driving paths of the at least two apparatus transporters to positions of the target vehicles have an overlapping position, in response to the driving paths having the overlapping position, exchange the mobile charging apparatuses of the at least two apparatus transporters at the overlapping position and determine a target apparatus transporter, and instruct the target transporter to travel to positions of the target vehicles and provide charging services to the target vehicles using the mobile charging apparatuses of the target apparatus transporter. A number of fully charged mobile charging apparatuses on the target apparatus transporter is greater than or equal to the number of the target vehicles.

In embodiments of the present disclosure, the charging requests sent from the target vehicles can be obtained. The at least two apparatus transporters with the fully charged mobile charging apparatuses can be obtained. When the number of the target vehicles is greater than the number of the fully charged mobile charging apparatuses in each apparatus transporter, whether the driving paths of the at least apparatus transporters to the positions of the target vehicles have an overlapping position can be determined. If the overlapping position exists, the mobile charging apparatuses of the at least two apparatus transporters can be exchanged at the overlapping position to determine the target apparatus transporter of the at least two apparatus transporters. If the number of the fully charged mobile charging apparatuses of the target apparatus transporter is greater than or equal to the number of the target vehicles, the target apparatus vehicle can be instructed to drive to the position of the target vehicles. The mobile charging apparatuses of the target apparatus transporter can be used to provide charging services to the target vehicles. In embodiments of the present disclosure, the mobile charging apparatuses of the apparatus transporters can be exchanged at the overlapping position of the driving paths of the at least two apparatus transporters to the position of the target vehicle to obtain the target apparatus transporter with the fully charged mobile charging apparatuses to provide the charging services to the target vehicles. In this process, the apparatus transporters for charging the target vehicles can be reduced, the vehicle charging cost can be reduced, and the distribution resources can be saved.

The above description is only an overview of the technical solution of the present disclosure. To better understand the technical means of the present disclosure, the present disclosure can be implemented according to the content of the specification. Embodiments of the present disclosure are described below to cause the purposes, features, and advantages to be more obvious.

BRIEF DESCRIPTION OF THE DRAWINGS

FIG. 1 is a schematic flowchart of a vehicle charging planning method according to some embodiments of the present disclosure.

DETAILED DESCRIPTION OF EMBODIMENTS

Figure 2:
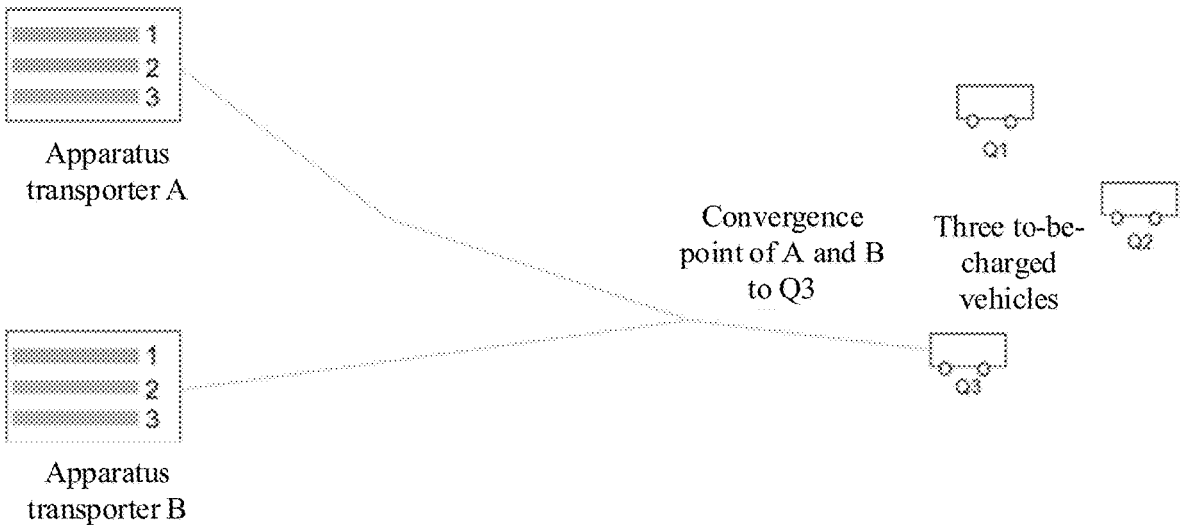
FIG. 2 is a schematic structural diagram of vehicle charging planning according to some embodiments of the present disclosure.

The technical solutions of embodiments of the present disclosure are described in detail below in connection with the accompanying drawings. The described embodiments are some embodiments of the present disclosure, not all embodiments. Based on embodiments of the present disclosure, all other embodiments obtained by those ordinary skilled in the art without creative efforts are within the scope of the present disclosure.

To better understand the present disclosure, various aspects of the present disclosure will be described in more detail with reference to the accompanying drawings. These detailed descriptions are descriptions of exemplary embodiments of the present disclosure only and are not intended to limit the scope of the present disclosure. Throughout the specification, a same reference numeral can refer to a same element. The expression "and/or" includes any and all combinations of one or more of the associated listed items.

Expressions such as "comprise," "include," "have," "contain," and/or "comprising" in the specification are open rather than closed expressions, which indicates that stated features, devices, and/or members exist. However, one or more other features, devices, members, and/or a combination thereof cannot be excluded. In addition, when an expression of "at least one of" is used in front of the list of the listed items, the expression can decorate the whole list not only a single item in the list. Moreover, when embodiments of the present disclosure are described, "can" can be used "in one or more embodiments of the present disclosure." Additionally, the term "exemplary" is intended to refer to an example or embodiment.

Unless otherwise defined, all terms (including technical terms and scientific terms) used herein have the same meaning as commonly understood by those of ordinary skill in the art. The term (e.g., the terms defined in a commonly used dictionary) can be interpreted to have a meaning consistent with the meaning in the context of the related technology. The term should not be interpreted with idealized or overly formal meanings unless specified in the present disclosure.

When there is no conflict, embodiments of the present disclosure and features in embodiments can be combined with each other. In addition, unless specified or contradictory to the context, the specific steps included in the method described in the present disclosure are not necessarily limited to the recited order but can be performed in any order or in parallel. The present disclosure is described in detail below with reference to the accompanying drawings and embodiments.

In some embodiments, FIG. 1 is a schematic flowchart of a vehicle charging planning method according to some embodiments of the present disclosure. As shown in FIG. 1, the vehicle charging planning method includes the following processes.

At 101, charging requests sent by a plurality of target vehicles are obtained.

In embodiments of the present disclosure, the method can be applied to the plurality of vehicles that need to be charged to plan the mobile charging apparatuses of the apparatus transportation vehicle to provide charging services for the target vehicles.

A target vehicle can refer to a vehicle that needs to be charged by using the mobile charging apparatus. A number of the target vehicles can be three, five, etc. In some embodiments, the number of the target vehicles can be determined as needed, which is not limited by embodiments of the present disclosure.

In some embodiments, the plurality of vehicles can send charging requests to a server. Vehicles of a certain area can be selected as target vehicles based on distances among the plurality of vehicles. In some embodiments, a detailed description can be made in connection with embodiments of the present disclosure.

In embodiments of the present disclosure, process 101 can include the following sub-processes.

At sub-process 1, the charging requests sent by the plurality of vehicles are obtained.

In some embodiments, a charging service platform can receive the charging requests sent by the plurality of vehicles in a short period of time. Thus, the plurality of charging requests can be planned based on the positions of the plurality of vehicles.

After receiving the charging requests sent from the plurality of vehicles in a short period of time, the service platform can perform sub-process 2.

At sub-process 2, based on the positions of the plurality of vehicles, some vehicles with distances among the vehicles less than a preset distance are determined as target vehicles.

After receiving the charging requests from the plurality of vehicles, some vehicles can be determined as the target vehicles based on the positions of the vehicles. That is, a distance between any two target vehicles can be less than the preset distance.

In the present disclosure, the vehicles with distances between the vehicles less than the preset distance can be determined as the target vehicles. Thus, fewer apparatus transportation vehicles can be used to satisfy the vehicle charging service. Time for distributing the charging apparatus can be reduced, and the charging efficiency can be improved.

After receiving the charging requests from the target vehicles, process 102 can be performed.

At 102, at least two apparatus transporters with fully charged mobile charging apparatuses are obtained.

After the charging requests sent from the plurality of target vehicles are obtained, the charging service platform can provide the charging services for the plurality of target vehicles. During this process, the charging service platform can obtain the plurality of apparatus transporters with fully charged mobile charging apparatuses and select at least two apparatus transporters based on the distances from the plurality of apparatus transporters and the target vehicles. This process can be described in detail as follows.

In embodiments of the present disclosure, process 102 can include the following sub-processes.

At sub-process 1, the plurality of apparatus transporters with fully charged mobile charging apparatuses are obtained.

In some embodiments, after obtaining the charging requests sent from the plurality of target vehicles, the charging service platform can obtain the plurality of apparatus transporters with the fully charged mobile charging apparatuses.

After the plurality of apparatus transporters with the fully charged mobile charging apparatuses are obtained, sub-process 2 can be executed.

At sub-process 2, driving paths of the plurality of apparatus transporters to the positions of the target vehicles are obtained.

After the plurality of apparatus transporters with fully charged mobile charging apparatus are obtained, the driving paths of the plurality of apparatus transporters to the positions of the target vehicles can be obtained.

After the driving paths of the plurality of apparatus transporters to the positions of the target vehicles are obtained, sub-process 3 can be executed.

At sub-process 3, the at least two apparatus transporters with path distances of the driving paths within the preset distance range are selected from the plurality of apparatus transporters.

After the driving paths of the plurality of apparatus transporters to the positions of the target vehicles are obtained, the at least two apparatus transporters with the path distances of the driving paths within the predetermined distance range can be selected from the plurality of apparatus transporters.

In embodiments of the present disclosure, time for an apparatus transporter to reach a target vehicle can be reduced by selecting the apparatus transporter with a close distance to provide the charging service for the target vehicle. Thus, the time for charging the target vehicle can be reduced.

After the at least two apparatus transporters with the fully charged mobile charging apparatuses are obtained, process 103 can be performed.

At 103, when the number of the target vehicles is greater than a number of the fully charged mobile charging apparatuses in each apparatus transporter, whether the driving paths of the at least two apparatus transporters traveling to the positions of the target vehicles overlap is determined.

After the at least two apparatus transporters with fully charged mobile charging apparatuses are obtained, whether the number of the target vehicles is greater than the number of the fully charged mobile charging apparatuses in each apparatus transporter of the at least two apparatus transporters can be determined.

If the number of the target vehicles is fewer than or equal to the number of the fully charged mobile charging apparatuses in each apparatus transporter of the at least two apparatus transporters, an apparatus transporter closest to the target vehicles can be selected from the at least two apparatus transporters to provide the charging services to the target vehicles. In some embodiments, this process can be described in detail as follows.

In embodiments of the present disclosure, after process 102, the method further includes the following processes.

At process 1, when the number of the target vehicles is fewer than or equal to the number of the fully charged mobile charging apparatuses on each apparatus transporter, the apparatus transporter closest to the positions of the target vehicles is obtained from the at least two apparatus transporters.

In some embodiments, when the number of the target vehicles is fewer than or equal to the number of the fully charged mobile charging apparatuses on each apparatus transporter of the at least two apparatus transporters, the apparatus transporter closest to the positions of the target vehicles can be obtained from the at least two apparatus transporters.

After the apparatus transporter of the at least two apparatus transporters closest to the target vehicles is obtained, process 2 can be performed.

At process 2, the apparatus transporter closest to the positions of the target vehicles is instructed to travel to the positions of the target vehicles to provide the charging services for the target vehicles.

After the apparatus transporter of the at least two apparatus transporters closest to the positions of the target vehicles is obtained, the apparatus transporter closest to the positions of the target vehicles can be instructed to travel to the positions of the target vehicles to provide the charging services for the target vehicles.

If the number of the target vehicles is greater than the number of the fully charged mobile charging apparatuses in each apparatus transporter, whether the driving paths of the at least two apparatus transporters traveling to the positions of the target vehicles have an overlapping position is determined. For example, as shown in FIG. 2, A and B are apparatus transporters. The driving paths of A and B to target vehicle Q3 have an intersection. The intersection can be the overlapping position of the driving paths of A and B to the position of target vehicle Q3.

If the driving paths of the at least two apparatus transporters to the positions of the target vehicles do not have an overlapping position, more apparatus transporters with the fully charged mobile charging apparatuses may need to be arranged to provide the charging services for the target vehicles, which is not described in the present disclosure.

If the driving paths of the at least two apparatus transporters to the positions of the target vehicles have the overlapping position, process 104 can be performed.

At 104, an exchange process is performed on the mobile charging apparatuses of the at least two apparatus transporters at the overlapping position, a target apparatus transporter of the at least two apparatus transporters is determined, and a number of the fully charged mobile charging apparatuses of the target apparatus transporter is greater than or equal to the number of the target vehicles.

The target apparatus transporter can refer to an apparatus transporter with the number of the fully charged mobile charging apparatuses after the mobile charging apparatuses of the at least two apparatus transporters are exchanged greater than or equal to the number of the target vehicles.

After determining that the driving paths of the at least two apparatus transporters to the positions of the target vehicles have the overlapping position, the at least two apparatus transporters can be instructed to exchange the mobile charging apparatuses at the overlapping position. Thus, the target apparatus transporter of the at least two apparatus transporters can be determined. The process of exchanging the mobile charging apparatuses is described in detail below.

In embodiments of the present disclosure, process 104 can include the following sub-processes.

At sub-process 1, a non-fully charged mobile charging apparatus of a first apparatus transporter of the at least two apparatus transporters is exchanged with a fully charged mobile charging apparatus of another apparatus transporter of the at least two apparatus transporters.

In some embodiments, after determining that the driving paths of the at least two apparatus transporters to the positions of the target vehicles have the overlapping position, the non-fully charged mobile charging apparatus of the first apparatus transporter of the at least two apparatus transporters can be exchanged with the fully charged mobile charging apparatus of another apparatus transporter of the at least two apparatus transporters at the overlapping position after the at least two apparatus transporters travel to the overlapping position. That is, the non-fully charged mobile charging apparatus of the first apparatus transporter can be exchanged with the fully charged mobile charging apparatus.

After the non-fully charged mobile charging apparatus of the first apparatus transporter is exchanged with the fully charged mobile charging apparatus of the another apparatus transporter, sub-process 2 can be performed.

At sub-process 2, After the exchange is completed, the number of the target vehicles is compared with the number of the mobile charging apparatuses of the first apparatus transporter.

After the exchange of the mobile charging apparatuses is completed, the number of the target vehicles can be compared with the number of the mobile charging apparatuses of the first apparatus transporter.

At sub-process 3, if the number of the target vehicles is fewer than or equal to the number of the mobile charging apparatuses of the first apparatus transporter, the first apparatus transporter is used as the target apparatus transporter.

If the number of target vehicles is fewer than or equal to the number of mobile charging apparatuses of the first apparatus transporter, the first apparatus transporter can provide the charging services to the target vehicles. Thus, the first apparatus transporter can be used as the target apparatus transporter.

If the number of the target vehicles is greater than the number of the mobile charging apparatuses of the first apparatus transporter, the mobile charging apparatuses can be exchanged again. In some embodiments, the process is described in detail below.

In some other embodiments of the present disclosure, process 104 may include the following sub-processes.

At sub-process 1, if the number of the target vehicles is greater than the number of the fully charged mobile charging apparatuses of the first apparatus transporter, a non-fully charged mobile charging apparatus of a second apparatus transporter of other apparatus transporters is exchanged with a fully charged mobile charging apparatus of the remaining apparatus transporters of the other apparatus transporters.

In some embodiments, if the number of the target vehicles is greater than the number of the fully charged mobile charging apparatuses of the first apparatus transporter, the non-fully charged mobile charging apparatus of the second apparatus transporter of the other apparatus transporters can be exchanged with the fully charged mobile charging apparatus of the remaining apparatus transporters of the other apparatus transporters.

At sub-process 2, after the exchange, if a number of the mobile charging apparatuses of the first apparatus transporter and the mobile charging apparatuses of the second apparatus transporter is greater than or equal to the number of the target vehicles, the first apparatus transporter and the second apparatus transporter are used as the target apparatus transporters.

After the exchange, the mobile charging apparatuses of the first apparatus transporter and the second apparatus transporter are fully charged.

If the number of the mobile charging apparatuses on the first apparatus transporter and the mobile charging apparatuses of the second apparatus transporter is greater than or equal to the number of the target vehicles, the first apparatus transporter and the second apparatus transporter can be used as the target apparatus transporters to provide the charging services for the target vehicles using the mobile charging apparatuses of the first apparatus transporter and the second apparatus transporter.

If the number of mobile charging apparatuses of the first apparatus transporter and the second apparatus transporter is fewer than the number of the target vehicles, the process of exchanging the mobile charging apparatuses can be performed repeatedly until a number of fully charged mobile charging apparatuses is greater than or equal to the number of the target vehicles, which is similar as above and is not repeated here.

After the process of exchanging the mobile charging apparatuses of the at least two apparatus transporters at the overlapping position is performed to determine the target apparatus transporter of the at least two apparatus transporters, process 105 can be performed.

At 105, the target apparatus transporter is instructed to drive to the positions of the target vehicles to provide the charging services to the target vehicles using the mobile charging apparatuses of the target apparatus transporter.

After the target apparatus transporter of the at least two apparatus transporters is determined by exchanging the mobile charging apparatuses of the at least two apparatus transporters at the overlapping position, the target apparatus transporter can be instructed to drive to the positions of the target vehicles and provide the charging services to the target vehicles using the mobile charging apparatuses of the target apparatus transporter.

The technical solution of embodiments of the present disclosure can be described in detail in combination with an application environment diagram below.

FIG. 2 is a schematic structural diagram of vehicle charging planning according to some embodiments of the present disclosure. As shown in FIG. 2, the target vehicles that need to be charged include Q1, Q2, and Q3, and the at least two apparatus transporters include A and B. Each of A and B carries three mobile charging apparatuses. When driving paths of A and B to Q3 have an overlapping position (i.e., a convergence point of A and B to a position of Q3 in the figure), A and B can be instructed to drive to the overlapping position. The mobile charging apparatuses of A and B can be exchanged. Thus, one vehicle of A and B can carry three fully charged mobile charging apparatuses. The vehicle can transport the mobile charging apparatuses to the position of Q3 to provide charging services to Q1, Q2, and Q3.

In the above solution of embodiments of the present disclosure, the mobile charging apparatuses of the apparatus transporters can be exchanged at the overlapping position after the at least two apparatus transporters drive to the overlapping position of the driving paths to the position of the target vehicles. Thus, the target apparatus transporter with the fully charged mobile charging apparatuses can be obtained to provide the charging services to the target vehicles. During this process, the apparatus transporters can be reduced for the target vehicles, and the vehicle charging cost can be reduced.

In the vehicle charging planning method of embodiments of the present disclosure, the charging requests sent from the target vehicles can be obtained. The at least two apparatus transporters with the fully charged mobile charging apparatuses can be obtained. When the number of the target vehicles is greater than the number of the fully charged mobile charging apparatuses in each apparatus transporter, whether the driving paths of the at least apparatus transporters to the positions of the target vehicles have an overlapping position can be determined. If the overlapping position exists, the mobile charging apparatuses of the at least two apparatus transporters can be exchanged at the overlapping position to determine the target apparatus transporter of the at least two apparatus transporters. If the number of the fully charged mobile charging apparatuses of the target apparatus transporter is greater than or equal to the number of the target vehicles, the target apparatus vehicle can be instructed to drive to the position of the target vehicles. The mobile charging apparatuses of the target apparatus transporter can be used to provide the charging services to the target vehicles. In embodiments of the present disclosure, the mobile charging apparatuses of the apparatus transporters can be exchanged at the overlapping position of the driving paths of the at least two apparatus transporters to the position of the target vehicle to obtain the target apparatus transporter with the fully charged mobile charging apparatuses to provide the charging services to the target vehicles. In this process, the apparatus transporters for charging the target vehicles can be reduced, the vehicle charging cost can be reduced, and the distribution resources can be saved.

Figure 3:
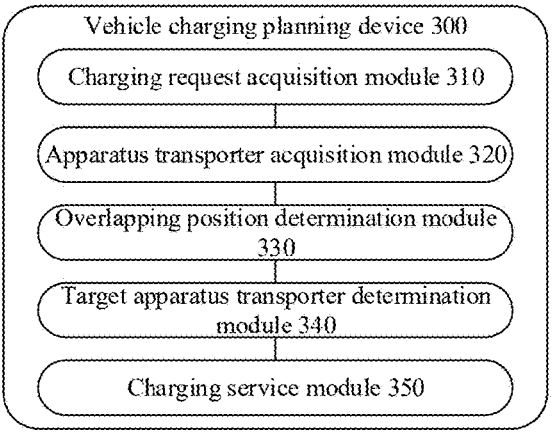
FIG. 3 is a schematic structural diagram of a vehicle charging planning device according to some embodiments of the present disclosure.

FIG. 3 is a schematic structural diagram of a vehicle charging planning device 300 according to some embodiments of the present disclosure. As shown in FIG. 3, the vehicle charging planning device 300 includes a charging request acquisition module 310, an apparatus transporter acquisition module 320, an overlapping position determination module 330, a target apparatus transporter determination module 340, and a charging service module 350.

The charging request acquisition module 310 can be configured to obtain the charging requests sent from the plurality of target vehicles.

The apparatus transporter acquisition module 320 can be configured to obtain the at least two apparatus transporters with the fully charged mobile charging apparatuses.

The overlapping position determination module 330 can be configured to determine whether the driving paths of the at least two apparatus transporters to the position of the target vehicles have the overlapping position when the number of the target vehicles is greater than the number of the fully charged mobile charging apparatuses in each apparatus transporter.

The target apparatus transporter determination module 340 can be configured to exchange the mobile charging apparatuses of the at least two apparatus transporters at the overlapping position when the driving paths of the at least two apparatus transporters to the position of the target vehicles have the overlapping position and determine the target apparatus transporter of the at least two apparatus transporters. The number of the fully charged mobile charging apparatuses of the target apparatus transporter is greater than or equal to the number of the target vehicles.

The charging service module 350 can be configured to instruct the target apparatus transporter to travel to the position of the target vehicles and provide the charging services to the target vehicles using the mobile charging apparatuses of the target apparatus transporter.

In some embodiments, the charging request acquisition module can include a charging request acquisition unit and a target vehicle determination unit.

The charging request acquisition unit can be configured to obtain the charging requests sent from the plurality of vehicles.

The target vehicle determination unit can be configured to determine a plurality of vehicles with mutual distances smaller than the predetermined distance as the target vehicles according to the positions of the vehicles.

In some embodiments, the apparatus transporter acquisition module can include an apparatus transporter acquisition unit, a driving path acquisition unit, and an apparatus transporter selection unit.

The apparatus transporter acquisition unit can be configured to obtain the plurality of apparatus transporters with the fully charged mobile charging apparatuses.

The driving path acquisition unit can be configured to obtain the driving paths of the plurality of apparatus transporters to the positions of the target vehicles.

The apparatus transporter selection unit can be configured to select the at least two apparatus transporters from the plurality of apparatus transporters with the path distance of the driving paths within the predetermined distance range.

In some embodiments, the device can further include a transporter acquisition module and a vehicle charging module.

The transporter acquisition module can be configured to obtain the apparatus transporter of the at least two apparatus transporters closest to the positions of the target vehicles when the number of the target vehicles is fewer than or equal to the number of the fully charged mobile charging apparatuses in each apparatus transporter.

The vehicle charging module can be configured to instruct the apparatus transporter closest to the positions of the target vehicles to travel to the positions of the target vehicles and provide the charging services to the target vehicles.

In some embodiments, the target apparatus transporter determination module can include a first charging apparatus exchange unit, a number comparison unit, and a target apparatus transporter acquisition unit.

The first charging apparatus exchange unit can be configured to exchange the non-fully charged mobile charging apparatus of the first apparatus transporter of the at least two apparatus transporters with the fully charged mobile charging apparatus of the other apparatus transporters.

The number comparison unit can be configured to compare the number of the target vehicles with the number of the mobile charging apparatuses of the first apparatus transporter after the exchange is completed.

The target apparatus transporter acquisition unit can be configured to use the first apparatus transporter as the target apparatus transporter if the number of the target vehicles is fewer than or equal to the number of the mobile charging apparatuses of the first apparatus transporter.

In some embodiments, the target apparatus transporter determination module can further include a second charging apparatus exchange unit and a target apparatus transporter acquisition unit.

The second charging apparatus exchange unit can be configured to exchange the non-fully charged mobile charging apparatus of the second apparatus transporter of the other apparatus transporters with the fully charged mobile charging apparatus of the remaining apparatus transporters of the other apparatus transporters.

The target apparatus transporter acquisition unit can be configured to use the first apparatus transporter and the second apparatus transporter as the target apparatus transporters if the number of the mobile charging apparatuses of the first apparatus transporter and the second apparatus transporter is greater than or equal to the number of the target vehicles after the exchange is completed.

In the vehicle charging planning device of embodiments of the present disclosure, the charging requests sent from the target vehicles can be obtained. The at least two apparatus transporters with the fully charged mobile charging apparatuses can be obtained. When the number of the target vehicles is greater than the number of the fully charged mobile charging apparatuses in each apparatus transporter, whether the driving paths of the at least apparatus transporters to the positions of the target vehicles have an overlapping position can be determined. If the overlapping position exists, the mobile charging apparatuses of the at least two apparatus transporters can be exchanged at the overlapping position to determine the target apparatus transporter of the at least two apparatus transporters. If the number of the fully charged mobile charging apparatuses of the target apparatus transporter is greater than or equal to the number of the target vehicles, the target apparatus vehicle can be instructed to drive to the position of the target vehicles. The mobile charging apparatuses of the target apparatus transporter can be used to provide charging services to the target vehicles. In embodiments of the present disclosure, the mobile charging apparatuses of the apparatus transporters can be exchanged at the overlapping position of the driving paths of the at least two apparatus transporters to the position of the target vehicle to obtain the target apparatus transporter with the fully charged mobile charging apparatuses to provide the charging services to the target vehicles. In this process, the apparatus transporters for charging the target vehicles can be reduced, the vehicle charging cost can be reduced, and the distribution resources can be saved.

Embodiments of the present disclosure further provide an electronic apparatus. The electronic apparatus can include a memory, a processor, and a computer program stored in the memory and executable by the processor. The computer program can be executed by the processor to implement the vehicle charging planning method above.

Figure 4:
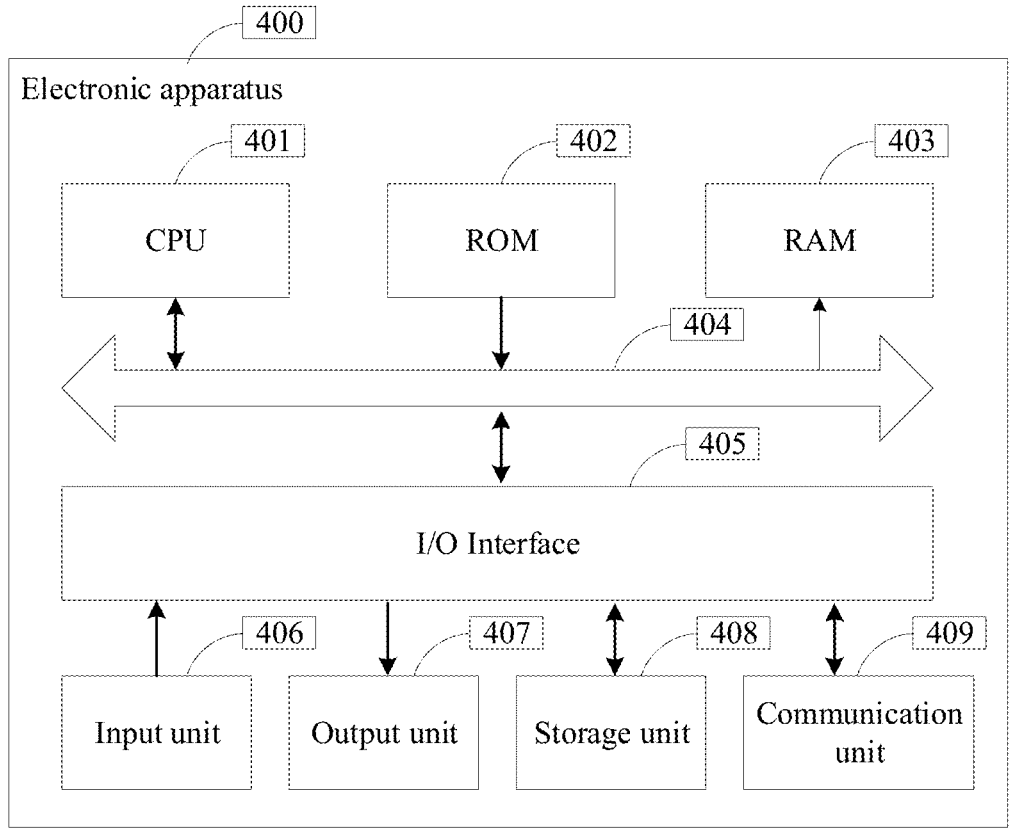
FIG. 4 is a schematic structural diagram of an electronic apparatus according to some embodiments of the present disclosure.

FIG. 4 is a schematic structural diagram of an electronic apparatus 400 according to some embodiments of the present disclosure. As shown in FIG. 4, the electronic apparatus 400 includes a central processing unit (CPU) 401. The CPU 401 can be configured to perform various appropriate actions and processing according to computer program instructions stored in a read-only memory (ROM) 402 or computer program instructions in a random access memory (RAM) 403 loaded from a storage unit 408. Various programs and data required for the operation of the electronic apparatus 400 can also be stored in the RAM 403. The CPU 401, the ROM 402, and the RAM 403 are connected to each other via a bus 404. An input/output (I/O) interface 405 is also connected to the bus 404.

A plurality of members of electronic apparatus 400 are connected to the I/O interface 405, including an input unit 406, such as a keyboard, mouse, microphone, etc., an output unit 407, such as various types of displays, speakers, etc., a storage unit 408, such as a disk, CD, etc., and a communication unit 409, such as a network card, modem, wireless communication transceiver, etc. The communication unit 409 allows the electronic apparatus 400 to exchange information/data with another apparatus via computer networks such as the Internet and/or various telecommunications networks.

The various processes and processing above can be performed by the processing unit 401. For example, the method of embodiments of the present disclosure can be implemented as a computer software program that is tangibly included in a computer-readable medium, such as the storage unit 408. In some embodiments, a part or all of the computer program can be loaded and/or installed on the electronic apparatus 400 via the ROM 402 and/or the communication unit 409. When the computer program is loaded into the RAM 403 and executed by the CPU 401, one or more actions of the method can be performed.

Embodiments of the present disclosure further provide a computer-readable storage medium. The computer program can be stored in the computer-readable storage medium. When the computer program is executed by the processor, the various processes of the vehicle charging planning method of embodiments of the present disclosure can be implemented. The same technical effect can be achieved, which is not repeated here. The computer-readable storage medium can include a read-only memory (ROM), a random access memory (RAM), a disk, a CD, etc.

In the present specification, the terms "including," "comprising," or any other variations thereof are intended to encompass non-exclusive inclusion, so that a process, method, article, or device including a series of elements includes not only those elements but also includes other elements not explicitly listed or elements inherent to such the process, method, article, or device. Unless otherwise specified, an element defined by "including a" does not exclude that the process, method, article, or device including the element also includes another same element.

Through the description of embodiments of the present disclosure, those skilled in the art can understand that the method of embodiments of the present disclosure can be implemented by software with a necessary general hardware platform or through the hardware. However, in many situations, the software can be a better solution. Based on this understanding, the essence of the technical solution of the present disclosure or the part of the technical solution of the present disclosure contributed to the existing technology can be implemented by a software product. The computer software product can be stored in a storage medium (e.g., ROM/RAM, magnetic disc, or an optical disc). The computer software product can include some instructions to cause one terminal (e.g., a cell phone, a computer, a server, a controller, or a network apparatus) to perform the method of embodiments of the present disclosure.

Embodiments of the present disclosure are described in conjunction with the accompanying drawings, but the present disclosure is not limited to embodiments of the present disclosure. The above embodiments are exemplary, not restrictive. Those of ordinary skilled in the art can make various modifications to embodiments of the present disclosure without departing from the essence of the present disclosure or the scope of the appended claims. These modifications are within the scope of the present disclosure.

Those of ordinary skill in the art can understand that units and algorithm steps of embodiments of the present disclosure can be implemented by electronic hardware or a combination of the computer software and the electronic hardware. Whether these functions are performed by the hardware or the software depends on a specific application of the technical solution and a design restriction condition. Those skilled in the art can implement the described functions of the specific application in different methods, and such implementation is within the scope of the present disclosure.

Those skilled in the art can understand that, for convenience and simple description, specific working processes of the system, device, and unit can refer to corresponding processes of the method embodiments, which are not repeated here.

In embodiments of the present disclosure, the disclosed device and method can be implemented in other manners. For example, the device embodiments are exemplary. For example, the division of the unit can be only a logical functional division, which can be divided in another manner in reality. For example, a plurality of units or assemblies can be combined or integrated into another system, or some features can be ignored or cannot be performed. On another aspect, mutual coupling or direct coupling or communication connection displayed or discussed can include indirect coupling or communication connection through some interfaces, devices, or units, which can be electrical, mechanical, or another form.

The unit described as a separate member can be physically separated or not, and the member displayed as a unit can be a physical unit or not. That is, the unit or the member can be located in a place or distributed at a plurality of network units. Some or all units can be selected as needed to implement the technical solution of embodiments of the present disclosure.

In addition, the functional units of embodiments of the present disclosure can be integrated into a processing unit, or can physically exist as separate units. In some other embodiments, two or more units can be integrated into one unit.

If the function is implemented as a software functional unit and sold or used as an independent product, the function can be stored in a computer-readable storage medium. Based on this understanding, the essence of the technical solution or the part of the technical solution contributes to the existing technology or a part of the technical solution can be embodied by the software product. The computer software product can be stored in a storage medium and include several instructions used to cause the computer apparatus (e.g., personal computer, server, or network apparatus) to perform all or some steps of the method of embodiments of the present disclosure. The storage medium can include a USB flash drive, an external hard drive, ROM, RAM, a magnetic disk, or an optical disk.

The above are only specific embodiments of the present disclosure. The scope of the present disclosure is not limited to this. Those skilled in the art can easily think of variations or replacements within the scope of the present disclosure. These variations and replacements are within the scope of the present disclosure. Thus, the scope of the present invention is subjected to the appended claims.

What is claimed is:

1. A method for vehicle charging planning, performed by a vehicle charging planning device, the method comprising:
    obtaining charging requests from a plurality of target vehicles;
    obtaining at least two apparatus transporters with fully charged mobile charging apparatuses, the at least two apparatus transporters including a first apparatus transporter and a second apparatus transporter;
    in response to a number of the plurality of target vehicles being greater than a number of fully charged mobile charging apparatuses in each apparatus transporter, determining whether driving paths of the first and the second apparatus transporters to a position of one of the plurality of target vehicles have an overlapping position;
    in response to the driving paths having the overlapping position, exchanging non-fully charged mobile charging apparatus of the first apparatus transporter with fully charged mobile charging apparatus of the second apparatus transporter at the overlapping position;
    determining the first apparatus transporter as a target apparatus transporter, a number of fully charged mobile charging apparatuses on the target apparatus transporter being greater than or equal to the number of the plurality of target vehicles; and
    instructing the target apparatus transporter to travel to positions of the plurality of target vehicles and providing charging services to the plurality of target vehicles using the mobile charging apparatuses of the target apparatus transporter.

2. The method according to claim 1, wherein obtaining the charging requests sent from the plurality of target vehicles includes:
    obtaining charging requests from a plurality of vehicles; and
    determining a plurality of vehicles located less than a predetermined distance apart as the plurality of target vehicles based on positions of the plurality of vehicles.

3. The method according to claim 1, wherein obtaining the at least two apparatus transporters with the fully charged mobile charging apparatuses includes:
    obtaining a plurality of apparatus transporters with fully charged mobile charging apparatuses;
    obtaining driving paths of the plurality of apparatus transporters to the positions of the plurality of target vehicles; and
    selecting the at least two apparatus transporters with the driving paths within a predetermined distance range from the plurality of apparatus transporters.

4. The method according to claim 1, further comprising, after obtaining the at least two apparatus transporters with the fully charged mobile charging apparatuses:
    in response to the number of the target vehicles being fewer than or equal to the number of the fully charged mobile charging apparatuses in each apparatus transporter, obtaining an apparatus transporter closest to the positions of the target vehicles from the at least two apparatus transporters; and
    instructing the apparatus transporter closest to the positions of the target vehicles to travel to the positions of the target vehicles to provide the charging services to the target vehicles.

5. The method according to claim 1, wherein exchanging non-fully charged mobile charging apparatus of the first apparatus transporter with fully charged mobile charging apparatus of the second apparatus transporter at the overlapping position include:

comparing the number of the target vehicles with the number of the mobile charging apparatuses of the apparatus transporter after exchange; and in response to the number of the target vehicles being fewer than or equal to the number of the mobile charging apparatuses of the apparatus transporter, using the apparatus transporter as the target apparatus transporter.

6. The method according to claim 5, wherein exchanging the mobile charging apparatuses of the at least two apparatus transporters non-fully charged mobile charging apparatus of the first apparatus transporter with fully charged mobile charging apparatus of the second apparatus transporter at the overlapping position further include:

in response to a number of mobile charging apparatuses of the first apparatus transporter and the second apparatus transporter being more than or equal to the number of the target vehicles, using the first apparatus transporter and the second apparatus transporter as target apparatus transporters.

7. A non-transitory computer-readable medium storing a computer program comprising computer-readable codes that, when the computer-readable codes are executed on an electronic apparatus, cause the electronic apparatus to perform the vehicle charging planning method of claim 1.

8. A vehicle charging planning device comprising:

a charging request acquisition module configured to obtain charging requests from a plurality of target vehicles;

an apparatus transporter acquisition module configured to obtain at least two apparatus transporters with fully charged mobile charging apparatuses, the at least two apparatus transporters including a first apparatus transporter and a second apparatus transporter;

an overlap path determination module configured to determine, in response to a number of the plurality of target vehicles being greater than a number of fully charged mobile charging apparatuses in each apparatus transporter, whether driving paths of the first and the second apparatus transporters to a position of one of the plurality of target vehicles have an overlapping position;

a target apparatus transporter determination module configured to determine the target apparatus transporter of the at least two apparatus transporters by exchanging non-fully charged mobile charging apparatus of the first apparatus transporter with fully charged mobile charging apparatus of the second apparatus transporter at the overlapping position in response to the driving paths of the first and the second apparatus transporters to the position of one of the plurality of target vehicles having the overlapping position, a number of fully charged mobile charging apparatuses on the target apparatus transporter being greater than or equal to the number of the target vehicles; and a charging service module configured to instruct the target apparatus transporter to drive to the positions of the target vehicles to provide charging services to the target vehicles using the mobile charging apparatuses of the target apparatus transporter.

9. The device according to claim 8, wherein the charging request acquisition module includes:

a charging request acquisition unit configured to obtain charging requests from a plurality of vehicles; and a target vehicle determination unit configured to determine a plurality of vehicles located less than a predetermined distance apart as the target vehicles according to positions of the plurality of vehicles.

10. The device according to claim 8, wherein the apparatus transporter acquisition module includes:

an apparatus transporter acquisition unit configured to obtain a plurality of apparatus transporters with fully charged mobile charging apparatuses;

a driving path acquisition unit configured to obtain driving paths of the plurality of apparatus transporters to reach the positions of the target vehicles; and an apparatus transporter selection unit configured to select the at least two apparatus transporters with the driving paths within a predetermined distance range from the plurality of apparatus transporters.

11. The device according to claim 8, further comprising:

a transporter acquisition module configured to obtain an apparatus transporter closest to the positions of the target vehicle from the at least two apparatus transporters in response to the number of the target vehicles being fewer than or equal to the number of the fully charged mobile charging apparatuses in each apparatus transporter; and a vehicle charging module configured to instruct the apparatus transporter closest to the positions of the target vehicles to drive to the positions of the target vehicles to provide the charging services to the target vehicles.

12. The device according to claim 8, wherein the target apparatus transporter determination module includes:

a number comparison unit configured to compare the number of the target vehicles with a number of mobile charging apparatuses of the apparatus transporter after exchange is completed; and a target apparatus transporter acquisition unit configured to use the apparatus transporter as the target apparatus transporter in response to the number of the target vehicles being fewer than or equal to the number of the mobile charging apparatuses of the first apparatus transporter.

13. The device according to claim 12, wherein the target apparatus transporter determination module further includes:

a target apparatus transporter acquisition unit configured to use the first apparatus transport apparatus and the second apparatus transporter as target apparatus transporters after exchange is completed in response to a number of mobile charging apparatuses of the first apparatus transporter and the second apparatus transporter being more than or equal to the number of the target vehicles.

14. An electronic apparatus comprising:

one or more processors; and one or more memories storing computer-readable codes that, when executed by the one or more processors, cause the one or more processors to:

obtain charging requests from a plurality of target vehicles;

obtain at least two apparatus transporters with fully charged mobile charging apparatuses, the at least two apparatus transporters including a first apparatus transporter and a second apparatus transporter;

in response to a number of the plurality of target vehicles being greater than a number of fully charged mobile charging apparatuses in each apparatus transporter, determine whether driving paths of the first and the second apparatus transporters to a position of one of the plurality of target vehicles have an overlapping position;

in response to the driving paths having the overlapping position, exchange two non-fully charged mobile charging apparatus of the first apparatus transporter with fully charged mobile charging apparatus of the second apparatus transporter at the overlapping position;

determine the first apparatus transporter as a target apparatus transporter, a number of fully charged mobile charging apparatuses of the target apparatus transporter being greater than or equal to the number of the plurality of target vehicles; and instruct the target apparatus transporter to travel to positions of the plurality of target vehicles and provide charging services to the plurality of target vehicles using the mobile charging apparatuses of the target apparatus transporter.

15. The electronic apparatus according to claim 14, wherein the one or more processors are further configured to:

obtain charging requests from a plurality of vehicles; and determine a plurality of vehicles located less than a predetermined distance apart as the plurality of target vehicles based on positions of the plurality of vehicles.

16. The electronic apparatus according to claim 14, wherein the one or more processors are further configured to:

obtain a plurality of apparatus transporters with fully charged mobile charging apparatuses;

obtain driving paths of the plurality of apparatus transporters to the positions of the plurality of target vehicles; and select the at least two apparatus transporters with the driving paths within a predetermined distance range from the plurality of apparatus transporters.

17. The electronic apparatus according to claim 14, wherein the one or more processors are further configured to:

in response to the number of the target vehicles being fewer than or equal to the number of the fully charged mobile charging apparatuses in each apparatus transporter, obtain an apparatus transporter closest to the positions of the target vehicles from the at least two apparatus transporters; and instruct the apparatus transporter closest to the positions of the target vehicles to travel to the positions of the target vehicles to provide the charging services to the target vehicles.

18. The electronic apparatus according to claim 14, wherein the one or more processors are further configured to:

compare the number of the target vehicles with the number of the mobile charging apparatuses of the apparatus transporter after exchange; and in response to the number of the target vehicles being fewer than or equal to the number of the mobile charging apparatuses of the apparatus transporter, use the apparatus transporter as the target apparatus transporter.

19. The electronic apparatus according to claim 18, wherein the one or more processors are further configured to:

in response to a number of mobile charging apparatuses of the first apparatus transporter and the second apparatus transporter being more than or equal to the number of the target vehicles, use the first apparatus transporter and the second apparatus transporter as target apparatus transporters.

* * * * *